(12) United States Patent
Fukami et al.

(10) Patent No.: US 9,794,273 B2
(45) Date of Patent: Oct. 17, 2017

(54) MONITORING CONTROL SYSTEM (71) Applicant: Mitsubishi Electric Corporation, Chiyoda-ku (JP)

(72) Inventors: Kenta Fukami, Chiyoda-ku (JP); Ryuta Inaba, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 13/909,141

(22) Filed: Jun. 4, 2013

(65) Prior Publication Data
US 2014/0215609 A1  Jul. 31, 2014

(30) Foreign Application Priority Data

Jan. 28, 2013 (JP) .................................. 2013-12802

(51) Int. Cl.
H04L 29/06 (2006.01)

(52) U.S. Cl.
CPC ........ *H04L 63/1408* (2013.01); *H04L 63/105* (2013.01)

(58) Field of Classification Search
CPC ......... G05D 2201/0215; G05D 7/0647; G05D 7/0676; G05D 16/202; G05D 23/19; H04B 7/2609; H04N 21/2407; H04L 63/1416; H04L 63/1408; H04L 63/145; H04L 63/105
USPC ....... 700/282, 108, 22, 276, 28, 286, 297, 9, 700/31, 47, 48, 97; 726/14, 23
See application file for complete search history.

(56) References Cited

U.S. PATENT DOCUMENTS

| | | | |
|---|---|---|---|
| 7,675,867 B1* | 3/2010 | Mraz et al. | 370/254 |
| 8,259,563 B1* | 9/2012 | Kothari | H04L 45/68 370/225 |
| 8,511,305 B2* | 8/2013 | Liu | A61M 16/1075 128/200.24 |
| 2002/0019958 A1* | 2/2002 | Cantwell et al. | 714/11 |
| 2004/0111524 A1 | 6/2004 | Namioka et al. | |

(Continued)

FOREIGN PATENT DOCUMENTS

| | | |
|---|---|---|
| JP | A-6-96040 | 4/1994 |
| JP | A-7-221816 | 8/1995 |

(Continued)

OTHER PUBLICATIONS

Office Action dated May 26, 2015 by the Japanese Patent Office in corresponding Japanese Patent Application No. 2013-012802, and a partial English Translation of the Office Action. (9 pages).

(Continued)

*Primary Examiner* — Matthew Smithers
(74) *Attorney, Agent, or Firm* — Buchanan Ingersoll & Rooney PC (57) ABSTRACT

In order to deal with security threat in a monitoring control system having a plurality of networks different in security level, the monitoring control system performs unidirectional physical communication between a monitoring control device connected to a network with a higher security level and a monitoring device connected to a network with a lower security level via a sender and a receiver, thereby securing safety of the network with the higher security level.

12 Claims, 5 Drawing Sheets

(56) References Cited

U.S. PATENT DOCUMENTS

| | | |
|---|---|---|
| 2005/0198291 A1 | 9/2005 | Hull et al. |
| 2006/0026292 A1 | 2/2006 | Namioka et al. |
| 2009/0002150 A1* | 1/2009 | Zilberstein ......... G05B 23/0208 |
| | | 340/531 |
| 2009/0293124 A1 | 11/2009 | Wang |
| 2011/0178640 A1* | 7/2011 | Schmidt ........................ 700/275 |
| 2012/0184207 A1* | 7/2012 | Gaines .................. H04W 40/02 |
| | | 455/11.1 |
| 2014/0208433 A1* | 7/2014 | Mraz et al. ..................... 726/26 |

FOREIGN PATENT DOCUMENTS

| | | |
|---|---|---|
| JP | 2000-115289 A | 4/2000 |
| JP | 2000-138690 A | 5/2000 |
| JP | 2004-120667 A | 4/2004 |
| JP | 2004-185483 A | 7/2004 |
| JP | 2004-274444 A | 9/2004 |
| JP | A-2004-356915 | 12/2004 |
| JP | 2005-032238 A | 2/2005 |
| JP | 2006-279338 A | 10/2006 |
| JP | 2009-532750 A | 9/2009 |

OTHER PUBLICATIONS

Dec. 20, 2016 Japanese Office Action issued in Japanese Application No. 2016-013982 by the Japanese Patent Office (11 pages), with English language translation.
Nov. 4, 2015 Japanese Office Action issued in Japanese Application No. 2013-012802.

* cited by examiner

MONITORING CONTROL SYSTEM

BACKGROUND OF THE INVENTION

1. Field of the Invention

The present invention relates to a monitoring control system having a plurality of networks different in security level.

2. Description of the Related Art

In a general monitoring control system, information from equipment to be monitored is detected by a temperature sensor, a pressure sensor, a position sensor, and other various types of sensors; information thereof is presented to an operating staff and/or an observer; and various types of driving devices such as a motor, a valve, a switch, and a hydraulic power unit are operated by the operation of the operating staff and/or the observer to control operation conditions of the equipment. Such a monitoring control system is used in a wide range of fields, for example, electric generating plants, chemical plants, power reception and distribution equipment, and water and sewerage.

Figure 5:
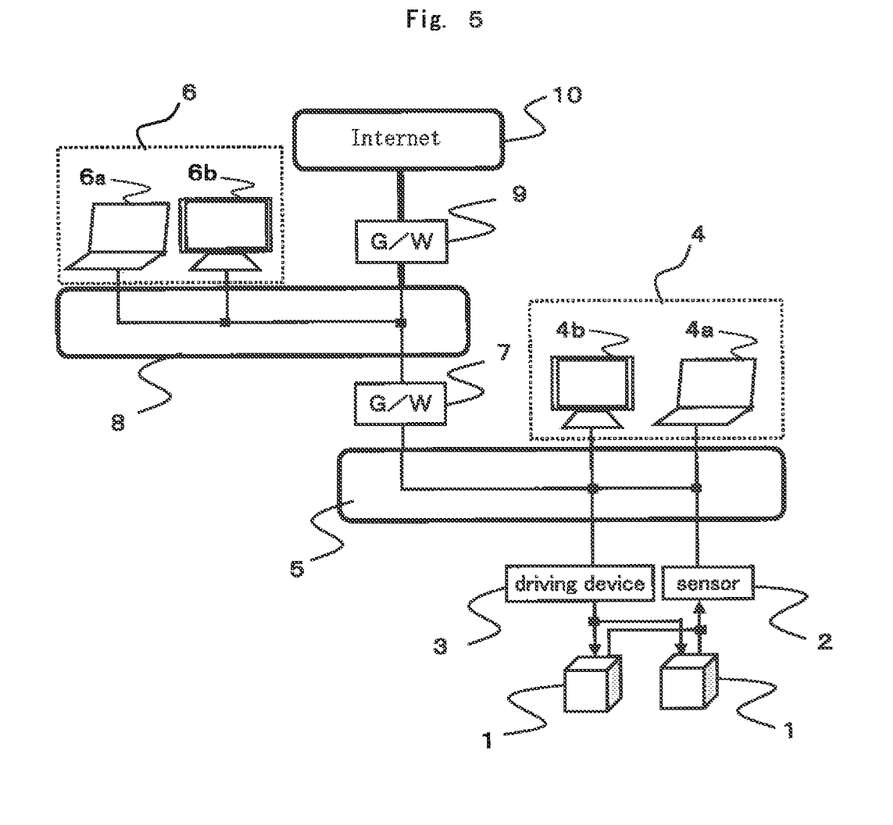
FIG. 5 is an outline configuration diagram showing a conventional monitoring control system.

A configuration shown in FIG. 5 is adopted as a typical example of such a monitoring control system.

In the drawing, the monitoring control system includes: equipment 1 to be monitored; various types of sensors 2 which detect temperature, pressure, position, and other operational information of the equipment 1; various types of driving devices 3 such as a motor, a valve, a switch, and a hydraulic power unit, which drive the equipment 1; and a monitoring control device 4 which monitors operation conditions of the equipment 1 based on information from the sensor 2 to control to be desired conditions. The monitoring control device 4 has an operation terminal 4a which processes the information from the sensor 2 to drive the driving devices 3 and controls the equipment 1 to be desired conditions, and a display 4b which displays the operation conditions of the equipment 1; and these devices are mutually connected via a network 5 in facilities.

Furthermore in order to monitor the operation conditions of the equipment 1 at a location different from a placing location of the monitoring control device 4, a monitoring device 6 is provided via a network 8 and a plant gateway (hereinafter, gateway is referred to as G/W) device 7 connected to the network 5. The monitoring device 6 is provided with a communication terminal 6a which is for performing data communication with the monitoring control device 4 and a display 6b. Incidentally, these networks 5, 8 are mounted by a dedicated or general-purpose protocol.

In this case, ordinarily, in order to collect information from the external unit and to perform data transmission to the external unit, a device such as the monitoring device 6 that does not perform operating control of the equipment 1 is also capable of being connected to the Internet 10 via an outside communication G/W device 9.

In such a conventional monitoring control system, the equipment 1 and the monitoring control device 4 that directly operates operating of the equipment 1 are protected by setting a security level high by the plant G/W device 7 in order to prevent entering from the external unit, for example, a cyber attack. However, although the monitoring device 6, which merely monitors, secures security by the outside communication G/W device 9, the monitoring device 6 communicates with the external unit ; and therefore, security level cannot be maintained high so much.

Accordingly, in the conventional monitoring control system, the network 5 with a higher security level can prevent entering from the external unit via the Internet 10. However, the network 8 with a lower security level has a possibility that the entering from the external unit cannot be prevented in connection with upgrading of a recent cyber attack; and when the network 8 is once infected by a virus or the like, there arises a possibility of security threat in that the network 5 with the higher security level is also infected utilizing a packet allowed in the network 8.

By the way, generally, there is known one in which a device that evaluates security is provided in a network to restrict communication from a network with the lower security level. (Japanese Unexamined Patent Publication No. 2006-279338)

Furthermore, there is known one in which a communication direction is switched by an optical switch in order to protect information asset from a cyber attack from an outside network. (Japanese Unexamined Patent Publication No. 2004-274444)

RELATED ART DOCUMENT

Patent Document

[Patent Document 1] Japanese Unexamined Patent Publication No. 2006-279338 (Paragraphs 0041, 0046)

[Patent Document 2] Japanese Unexamined Patent Publication No. 2004-274444 (Paragraph 0022)

[Patent Document 3] Japanese Unexamined Patent Publication No. 2005-32238 (Paragraph 0033)

[Patent Document 4] Japanese Unexamined Patent Publication No. 2004-185483 (Paragraph 0011)

However, when the protection device of the network such as the above Patent Document is applied, communication between the monitoring control device 4 and the monitoring device 6, which are different in security level, cannot be secured and a monitoring control system cannot be configured. Furthermore, in contrast, when the communication is secured, it is likely to be infected from the network 8 with the lower security level to the network 5 with the higher security level and reliability of the monitoring control system is impaired.

That is, although communication is limited by the use of a network firewall, the firewall is like a software-based security wall; and therefore, there is a possibility to change settings such that communication to a direction inhibited by the brittleness of the firewall itself and acquisition of administrative right becomes possible.

BRIEF SUMMARY OF THE INVENTION

The present invention has been made to solve the above described problem and is to provide a monitoring control system by which security can be secured by being capable of performing only unidirectional communication from a network with a higher security level, to a network with a lower security level.

According to the present invention, there is provided a monitoring control system including: a sensor which detects operation conditions of equipment to be controlled; a driving device which adjusts the operation conditions of said equipment; a monitoring control device which operates said driving device to control the operation conditions of said equipment based on the output of said sensor; a monitoring device which is capable of being connected to an outside network such as the Internet, and which is connected to said monitoring control device to monitor the operation conditions of said equipment; and a sender and a receiver, which are provided between said monitoring control device and said monitoring device to communicate in only one direction from said monitoring control device to said monitoring device In the monitoring control system, data communication is performed only from a network with a higher security level to a network with a lower security level.

According to the present invention, data communication from a network with a lower security level to a network with a higher security level can be blocked, whereby an effect is exhibited that reliability of a monitoring control system can be secured.

The foregoing and other object, features, aspects, and advantages of the present invention will become more apparent from the following detailed description of the present invention when taken in conjunction with the accompanying drawings.

DETAILED DESCRIPTION OF THE INVENTION

Embodiment 1

Hereinafter, the present invention will be described with reference to drawings of embodiments.

Figure 1:
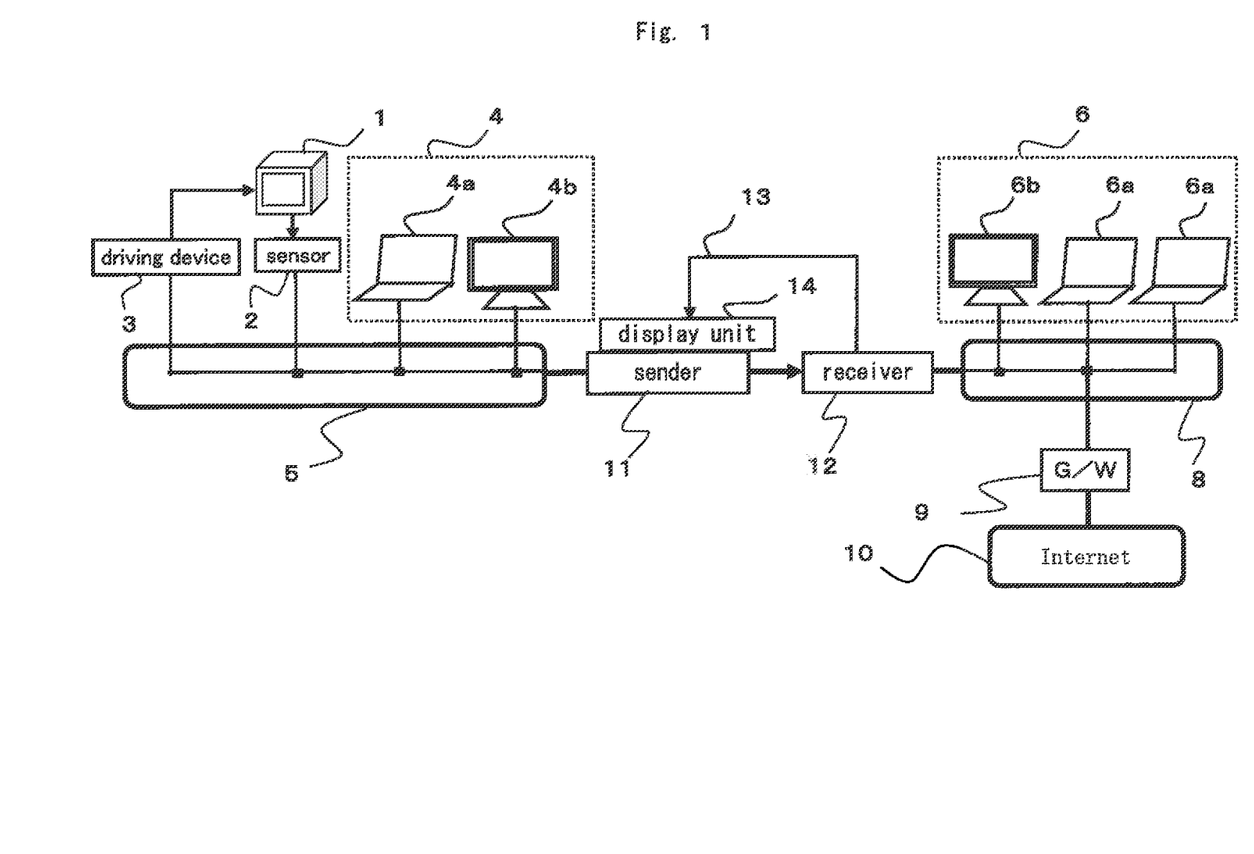
FIG. 1 is a configuration diagram showing a monitoring control system according to Embodiment 1 of the present invention.

FIG. 1 is a configuration diagram showing a monitoring control system according to Embodiment 1 of the present invention.

In the drawing, the monitoring control system has equipment 1 to be monitored and controlled; a sensor 2 which is attached to the equipment 1 and detects operation conditions of the equipment 1; a driving device 3 which controls the operation conditions of the equipment 1; and a monitoring control device 4 composed of an operation terminal 4a and a display 4b, which are connected to the sensor 2 and the driving device 3 via a network 5.

Furthermore, the monitoring control system has a monitoring device 6 connected to the monitoring control device 4 via a network 8 and the monitoring device 6 is capable of being connected to the Internet 10 via an outside communication G/W device 9.

In this case, the network 5 and the network 8 are configured to be capable of performing data communication in only one direction from the network 5 to the network 8 by intervening a sender 11 and a receiver 12 therebetween. Further, signals are fed back from the receiver 12 to the sender 11 side via a hard-wired part 13; and a display unit 14 which is for displaying an operation abnormality in the receiver 12 by the signals is provided.

Incidentally, only unidirectional data communication can be performed by mounting an optical cable in only one direction of the sender/receiver; and detection of abnormal conditions in the receiver 12 can be performed by using notification of reliability, availability, and serviceability (RAS) such as a power supply stop and/or non-arrival of a watchdog timer. Further, communication between the network 5 and the network 8 can be performed by a general-purpose protocol. Furthermore, the display unit 14 can also be omitted by supplying signals from the hard-wired part 13 to the display 4b of the monitoring control device 4.

Under such a configuration, the monitoring control device 4 transmits data of the operation conditions of the equipment 1 via the network 5 and the sender 11; and the receiver 12 receives the data and further supplies to the monitoring device 6 via the network 8.

As described above, the data is transmitted in one direction from the monitoring control device 4 to the monitoring device 6 using the sender 11 and the receiver 12; and consequently, data flow from the network 8 with a lower security level to the network 5 can be physically blocked and it becomes possible to enhance a security level of the network 5. As a result, reliability of the monitoring control system can be secured.

Furthermore, when the receiver 12 is not normally operated, such a condition can be displayed by the display unit 14 using the notification of RAS such as non-arrival of the watchdog timer; as a result, it becomes possible to understand that the monitoring device 6 does not normally receive the data and countermeasures can be devised.

Embodiment 2

Figure 2:
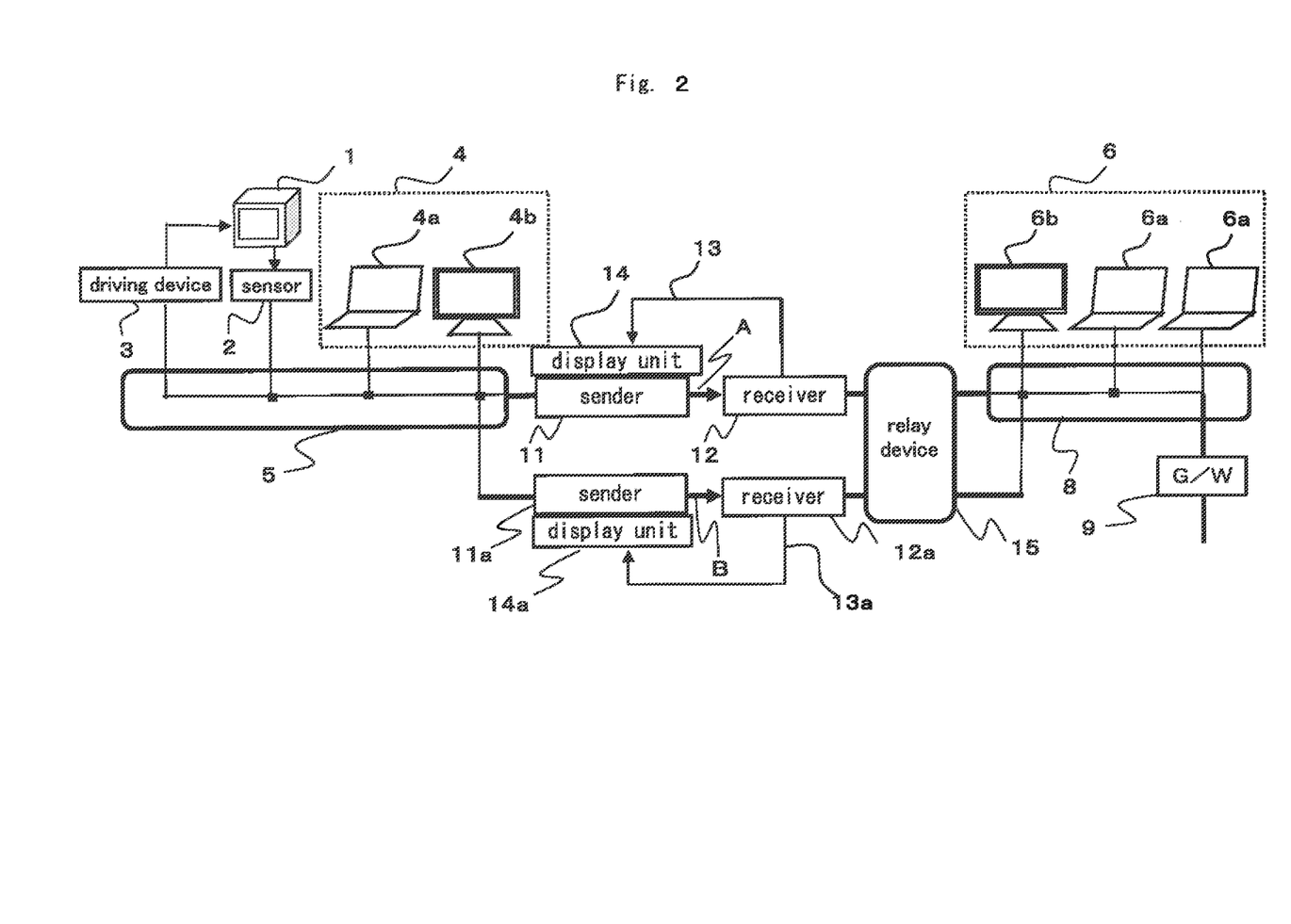
FIG. 2 is a configuration diagram showing a monitoring control system according to Embodiment 2 of the present invention.

FIG. 2 is a configuration diagram showing a monitoring control system according to Embodiment 2 of the present invention.

In the drawing, the monitoring control system includes: in addition to the configuration of Embodiment 1, a sender 11a and a receiver 12a, which are provided in parallel to the sender 11 and the receiver 12; and a relay device 15 which switches these devices in response to the absence or presence of notification of RAS.

The sender 11a and the receiver 12a have an equivalent function as the sender 11 and the receiver 12, respectively, and transmit the same data in parallel by a general-purpose protocol.

Furthermore, a configuration is made such that operation conditions the receiver 12a are fed back to the sender 11a side by a hard-wired part 13a.

Under such a configuration, during normal times, the relay device 15 regards the receiver 12 as a main system and the receiver 12a as a subsidiary system; and the relay device 15 transmits only data received by the receiver 12 via a transmission path A to a network with a lower security level 8.

Next, if an abnormality is generated, for example, notification of RAS such as non-arrival of a watchdog timer from the receiver 12 is received, the relay device 15 regards the receiver 12a as a main system immediately; and the relay device 15 transmits data received via a transmission path B to the network with the lower security level 8.

As described above, a redundant configuration, in which the relay device 15 switches to the receiver 12 side of the subsidiary system and transmits information when a failure in the receiver 12 of the main system is received, is adopted; and consequently, a data communication function can be maintained even when either the sender 11 or the receiver 12 is brought down.

Embodiment 3

Figure 3:
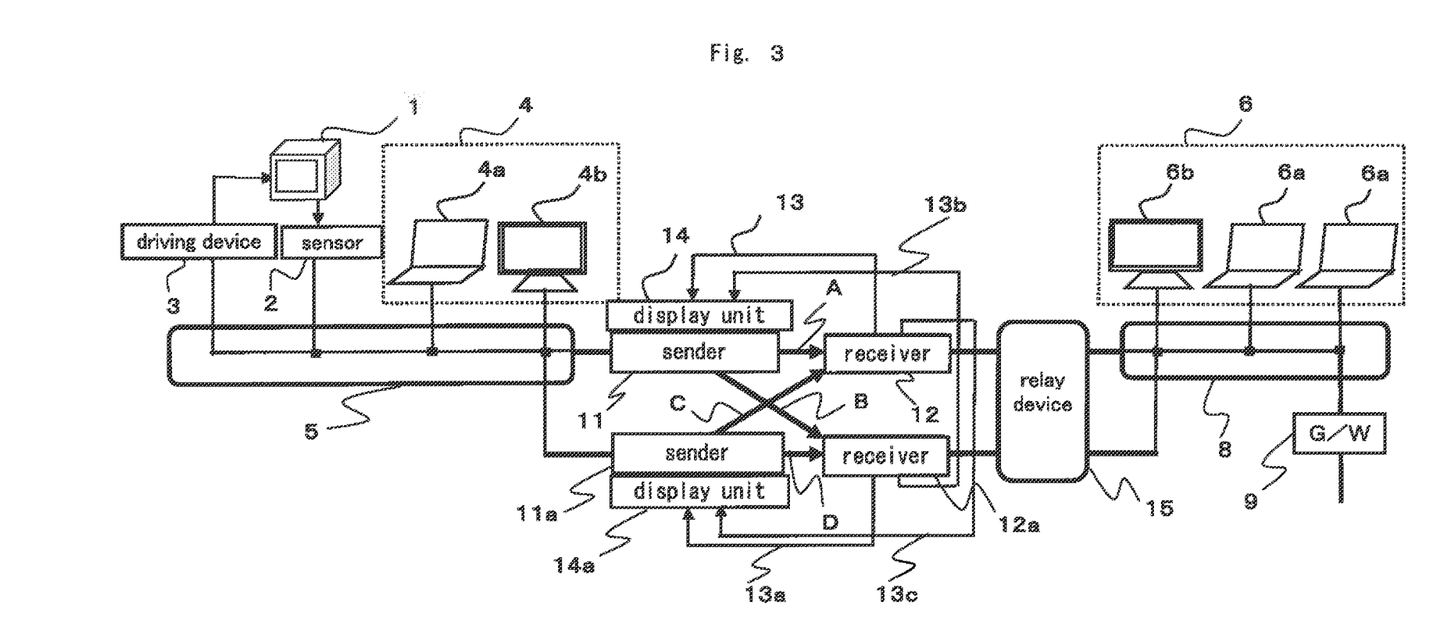
FIG. 3 is a configuration diagram showing a monitoring control system according to Embodiment 3 of the present invention.

FIG. 3 is a configuration diagram showing a monitoring control system according to Embodiment 3 of the present invention.

In the drawing, a monitoring control system is configured such that: in addition to the configuration of Embodiment 2, the same information is transmitted from a sender 11 to a receiver 12a and from a sender 11a to a receiver 12; and received data is selected by a relay device 15.

That is, during normal times, the relay device 15 sets priorities such that, a transmission path A is a first priority, a transmission path B is a second priority, a transmission path C is a third priority, and a transmission path D is a fourth priority; the relay device 15 transmits only received data via the transmission path A with a higher priority to a network with a lower security level 8. In this case, a determination of the priorities of the relay device 15 can be achieved by giving, for instance, a priority flag to the structure of data among the senders 11, 11a and the receivers 12, 12a.

Next, for example, when an abnormality is generated in the receiver 12, the abnormality of the receiver 12 is notified to the sender 11 via a hard-wired part 13 and a display unit 14, and the abnormality is notified to the sender 11a via a hard-wired part 13c and a display unit 14a. Accordingly, the sender 11 lowers the priority of the transmission path A than that of the transmission path B, and the sender 11a lowers the priority of the transmission path C than that of the transmission path D. As a result, the priorities are changed that the priority of the transmission path B is first and the priority of the transmission path D is second; and the relay device 15 transmits only data via the transmission path B to the network with a lower security level 8. Such a change in priorities in the senders 11, 11a can be achieved by a change in value of the priority flag. Furthermore, the generation of abnormality in the receiver 12 is displayed by the display unit 14 and the display unit 14a.

As described above, a redundant configuration, in which only data passed through a transmission path with a higher priority among four transmission paths is transmitted by the relay device 15, is adopted; and consequently, even when the sender and the receiver are brought down one after another, a data communication function can be maintained and reliability of the monitoring control system can be improved.

Embodiment 4

Figure 4:
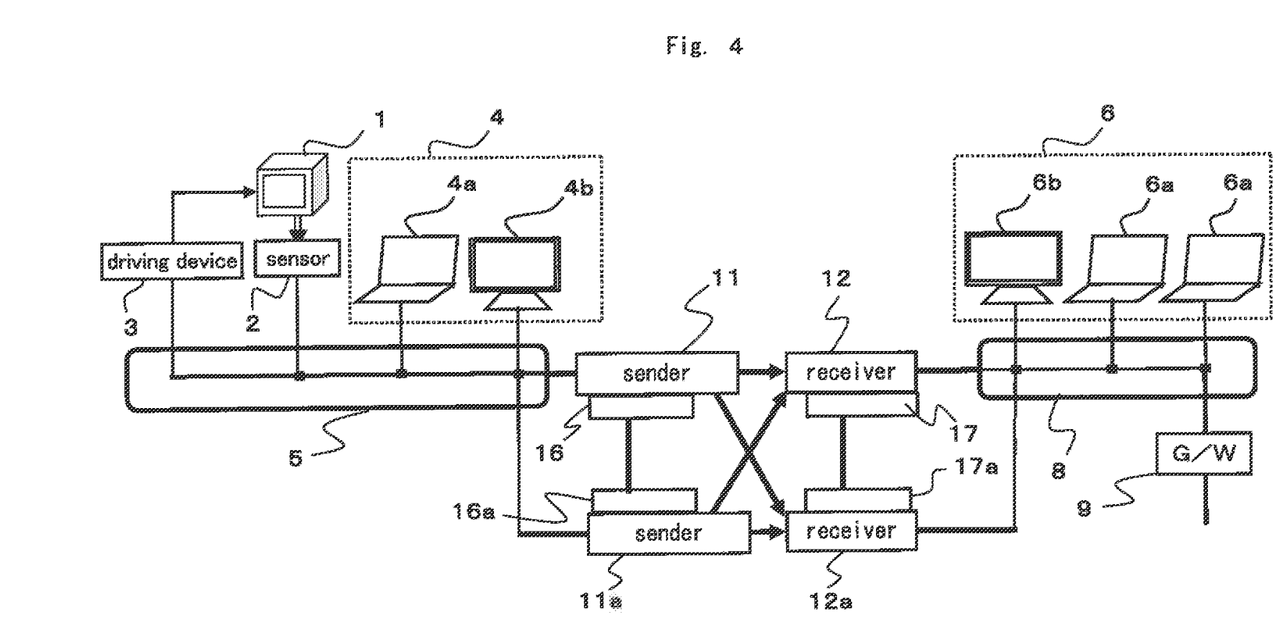
FIG. 4 is a configuration diagram showing a monitoring control system according to Embodiment 4 of the present invention.

FIG. 4 is a configuration diagram showing a monitoring control system according to Embodiment 4 of the present invention.

In the monitoring control system, a redundant configuration is achieved by providing a system switching device 16, 16a, 17, 17a on a sender 11, 11a and a receiver 12, 12a, respectively That is, the system switching device 16 has a function to recognize that the sender 11 is regarded as a main system and the system switching device 16a has a function to recognize that the sender 11a is regarded as a subsidiary system; and the system switching device 17 has a function to recognize that the receiver 12 is regarded as the main system and the system switching device 17a has a function to recognize that the receiver 12a is regarded as the subsidiary system.

In this case, during normal operation, data to be transmitted from the sender 11 to the receiver 12 is regarded as the main system and only the receiver 12 of the main system transmits the data to a network with a lower security level 8; and the receiver 12a of the subsidiary system does not transmit the data to the network 8.

Next, for example, when an abnormality is generated in the receiver 12, the system switching device 17 detects this and regards the receiver 12 as the subsidiary system. Then, the system switching device 17 notifies this to the system switching device 17a and the system switching device 17a regards the receiver 12a as the main system. By this, the sender 11 and the receiver 12a are regarded as the main system and data to be transmitted from the sender 11 to the receiver 12a is transmitted to the network with the lower security level 8.

Furthermore, when an abnormality is generated in the sender 11, the system switching device 16 detects this and regards the sender 11 as the subsidiary system. Then, the system switching device 16 notifies this to the system switching device 16a and the system switching device 16a regards the sender 11a as the main system. By this, the sender 11a and the receiver 12 are regarded as the main system and data to be transmitted from the sender 11a to the receiver 12 is transmitted to the network with the lower security level 8.

Similarly, when an abnormality is generated in the sender 11 and the receiver 12, the system switching device 16 regards the sender 11 as the subsidiary system and the system switching device 16a regards the sender ha as the main system; and the system switching device 17 regards the receiver 12 as the subsidiary system and the system switching device 17a regards the receiver 12a as the main system. By this, data to be transmitted from the sender 11a to the receiver 12a is transmitted to the network 8.

As described above, the system switching device 16, 16a controls the main system or the subsidiary system of the sender 11, 11a and the system switching device 17, 17a controls the main system or the subsidiary system of the receiver 12, 12a; and consequently, the redundant configuration can be achieved. For example, even when the sender and the receiver are brought down one after another, transmitting and receiving functions can be maintained. As a result, reliability of the monitoring control system can be improved.

Furthermore, the system switching devices 16, 16a, 17, 17a are incorporated in the monitoring control system as software; and consequently, a different device such as the relay device 15 in FIG. 2 and FIG. 3 does not need to be provided and the device can be configured inexpensively. Further, a case of a failure in the relay device 15 does not need to be assumed.

Incidentally, in the present invention, the respective embodiments can be appropriately changed or omitted within the scope of the present invention.

The present invention can be applied to a monitoring control system for use in electric generating plants, chemical plants, power reception and distribution equipment, water and sewerage, and the like.

Various modifications and alternations of this invention will be apparent to those skilled in the art without departing from the scope and spirit of this invention, and it should be understood that this is not limited to the illustrative embodiments set forth herein.

What is claimed is:

1. A monitoring control system comprising:
a sensor which detects operation conditions of equipment to be controlled;
a driving device which adjusts the operation conditions of said equipment;
a monitoring control device which operates said driving device to control the operation conditions of said equipment based on the output of said sensor;
a monitoring device which is connected to said monitoring control device to monitor the operation conditions of said equipment;

a first sender and a first receiver, which are provided between said monitoring control device and said monitoring device to communicate in only one direction from said monitoring control device to said monitoring device;

a hard-wired part connecting said first receiver to said first sender, and an operation abnormality signal in said first receiver is transmitted to said first sender through said hard-wired part from said first receiver; and a second sender and a second receiver, which are provided in parallel to said first sender and said first receiver, and which communicate in only one direction from said monitoring control device to said monitoring device, wherein a first network connects the sensor, the driving device, the monitoring control device, the first sender, and the second sender to each other, and a second network connects the monitoring device, the first receiver, and the second receiver to each other, wherein the first network has a higher security level than the second network, and data communication is performed only from the first network to the second network, and wherein during normal operation, only data received from the first receiver is transmitted to the second network, and if an abnormality is generated in the first receiver, data received from the second receiver is transmitted to the second network.

2. The monitoring control system according to claim 1, further comprising:

a relay device which selects a transmission path through which data is transmitted from said monitoring control device to said monitoring device.

3. The monitoring control system according to claim 1, further comprising:

a relay device, connected to the first and second receiver, and configured to select a transmission path through which data is transmitted from said monitoring control device to said monitoring device.

4. The monitoring control system according to claim 1, further comprising:

a system switching device which is provided in each of said first and second sender and in each of said first and second receiver to monitor communication conditions thereof and to switch transmission paths of data, and which selects the transmission path through which data is transmitted from said monitoring control device to said monitoring device.

5. The monitoring control system according to claim 1, wherein the hard-wired part is connected to a display unit on the first sender.

6. The monitoring control system according to claim 5, wherein the display unit is configured to display an operation abnormality in the first receiver.

7. The monitoring control system according to claim 1, wherein the second sender sends the same data as the first sender.

8. The monitoring control system according to claim 1, wherein when the abnormality occurs in the first receiver, the second sender sends the data to the second network via the second receiver.

9. The monitoring control system according to claim 1, wherein each of the first and second senders has an associated display unit.

10. The monitoring control system according to claim 1, wherein the data received from the second receiver was sent from the second sender.

11. The monitoring control system according to claim 1, wherein the first sender and the first receiver are separate devices and are located apart from each other.

12. The monitoring control system according to claim 1, wherein the second sender and the second receiver are separate devices and are located apart from each other.

* * * * *